(12) United States Patent
Li et al.

(10) Patent No.: US 11,328,151 B2
(45) Date of Patent: May 10, 2022

(54) CELL RECOGNITION

(71) Applicants: IMEC VZW, Leuven (BE); Katholieke Universiteit Leuven, KU LEUVEN R&D, Leuven (BE)

(72) Inventors: Yuqian Li, Leuven (BE); Geert Vanmeerbeeck, Leuven (BE); Alexandra Dusa, Leuven (BE)

(73) Assignees: IMEC VZW, Leuven (BE); Katholieke Universiteit Leuven, KU LEUVEN R&D, Leuven (BE)

( * ) Notice: Subject to any disclaimer, the term of this patent is extended or adjusted under 35 U.S.C. 154(b) by 234 days.

(21) Appl. No.: 16/631,396

(22) PCT Filed: Jul. 16, 2018

(86) PCT No.: PCT/EP2018/069324
§ 371 (c)(1),
(2) Date: Jan. 15, 2020

(87) PCT Pub. No.: WO2019/016169
PCT Pub. Date: Jan. 24, 2019

(65) Prior Publication Data
US 2020/0218882 A1     Jul. 9, 2020

(30) Foreign Application Priority Data
Jul. 16, 2017  (EP) ..................................... 17181569

(51) Int. Cl.
*G06K 9/00* (2006.01)
*G01N 15/14* (2006.01)
(Continued)

(52) U.S. Cl.
CPC ..... *G06K 9/00147* (2013.01); *G01N 15/1429* (2013.01); *G06K 9/00134* (2013.01);
(Continued)

(58) Field of Classification Search
CPC .............. G01N 33/491; G01N 33/4915; G06T 2207/30004; G06T 7/0012
See application file for complete search history.

(56) References Cited

U.S. PATENT DOCUMENTS 7,522,757 B2 *  4/2009  Tsipouras ............... G01N 1/312
                                                              382/128
7,552,757 B2 *  6/2009  Hassdenteufel ...... F28D 1/0408
                                                              165/176
(Continued)

OTHER PUBLICATIONS

Dannhauser, David, Domenico Rossi, Pasquale Memmolo, Filippo Causa, Andrea Finizio, Pietro Ferraro, and Paolo A. Netti. "Label-free analysis of mononuclear human blood cells in microfluidic flow by coherent imaging tools." Journal of biophotonics 10, No. 5 (2017): 683-689.

(Continued)

*Primary Examiner* — Yosef Kassa
(74) *Attorney, Agent, or Firm* — McDonnell Boehnen Hulbert & Berghoff LLP

(57) ABSTRACT

Disclosed herein are cell differentiating systems for differentiating cells. The systems comprise an input means for receiving a reconstructed image of a cell based on a holographic image of the cell in suspension, and a cell recognition means for determining cell characterization features from the reconstructed image of the cell for characterization of the cell. The cell recognition means thereby is configured for determining, as cell recognition features, image moments.

19 Claims, 8 Drawing Sheets

(51) Int. Cl.
*G06K 9/52* (2006.01)
*G01N 15/10* (2006.01)

(52) U.S. Cl.
CPC ......... *G06K 9/00201* (2013.01); *G06K 9/525* (2013.01); *G01N 2015/1006* (2013.01); *G06K 2209/05* (2013.01)

(56) References Cited

U.S. PATENT DOCUMENTS

| | | | | |
|---|---|---|---|---|
| 7,595,874 | B1* | 9/2009 | Pelekhaty | G01N 21/6458 356/318 |
| 7,640,112 | B2* | 12/2009 | Tsipouras | G06T 7/0012 702/19 |
| 7,755,619 | B2* | 7/2010 | Wang | G06T 7/55 703/2 |
| 7,903,241 | B2* | 3/2011 | Wardlaw | G01N 15/05 356/39 |
| 7,929,122 | B2* | 4/2011 | Wardlaw | G06T 7/0012 356/40 |
| 7,964,171 | B2* | 6/2011 | Sugimoto | C01B 32/977 423/345 |
| 8,964,171 | B2* | 2/2015 | Zahniser | G01N 15/1463 356/39 |
| 2016/0231225 | A1 | 8/2016 | Hayden et al. | |

OTHER PUBLICATIONS

Bao, H. F., H. C. Den Harink, E. S. Gelsema, and A. W. M. Smeulders. "Automated white blood cell classification revisited." Medical Informatics 12, No. 1 (1987): 23-31.

Chen, Claire Lifan, Ata Mahjoubfar, Li-Chia Tai, Ian K. Blaby, Allen Huang, Kayvan Reza Niazi, and Bahram Jalali. "Deep learning in label-free cell classification." Scientific reports 6 (2016): 21471.

Gelsema, E. S., H. F. Bao, A. W. M. Smeulders, and H. C. Den Harink. "Application of the method of multiple thresholding to white blood cell classification." Computers in biology and medicine 18, No. 2 (1988): 65-74.

Theera-Umpon, Nipon, and Sompong Dhompongsa. "Morphological granulometric features of nucleus in automatic bone marrow white blood cell classification." IEEE Transactions on Information Technology in Biomedicine 11, No. 3 (2007): 353-359.

Tabrizi, P. R., S. H. Rezatofighi, and M. J. Yazdanpanah. "Using PCA and LVQ neural network for automatic recognition of five types of white blood cells." In 2010 Annual International Conference of the IEEE Engineering in Medicine and Biology, pp. 5593-5596. IEEE, 2010.

Habibzadeh, M., Krzyżak, A. and Fevens, T., 2013. Comparative study of shape, intensity and texture features and support vector machine for white blood cell classification. Journal of Theoretical and Applied Computer Science, 7(1), pp. 20-35.

Asadi, M.R., Vahedi, A. and Amindavar, H., Jun. 2006. Leukemia cell recognition with Zernike moments of holographic images. In Proceedings of the 7th Nordic Signal Processing Symposium—NORSIG 2006 (pp. 214-217). IEEE.

PCT International Search Report and Written Opinion, PCT International Application No. PCT/EP2018/069324, dated Oct. 9, 2018, 11 pages.

Moon, Inkyu, Bahram Javidi, Faliu Yi, Daniel Boss, and Pierre Marquet. "Automated statistical quantification of three-dimensional morphology and mean corpuscular hemoglobin of multiple red blood cells." Optics express, vol. 20, No. 9 (Apr. 23, 2012): 10295-10309.

* cited by examiner

CELL RECOGNITION

CROSS-REFERENCE TO RELATED APPLICATIONS

This application is a national stage application under 35 U.S.C. § 371 of International Application NO. PCT/EP2018/069324, files Jul. 16, 2018, which claims the benefit of priority from European Application No. EP 17181569.9, filed Jul. 16, 2017. The disclosures of all of the above applications are incorporated by reference herein in their entireties.

FIELD

The present disclosure relates to the field of biological image processing and cell classification. More specifically, it relates to systems and methods for label-free counting and/or classifying of cells, for example, in lens-free holographic imaging flow cytometry.

BACKGROUND

Cell characterization plays an important role in medical diagnostics. For example, white blood cells (WBCs), also known as leukocytes, play important roles in the immune system by helping to fight against pathogens. Recognition of WBCs can assist in diagnosing many diseases, such as leukemia, AIDS and some common virus. Differentiation of the three parts of WBCs, i.e. T-lymphocytes, granulocytes and monocytes, has been a topic of particular interest to hematologists.

Conventional white blood cell recognition usually requires several image processing steps. Feature analysis and classification have been investigated for cell identification using different image modalities. The earliest cell classification attempts are based on segmentation. Bao et al. obtained quantitative measurements from cell images without separation of nucleus from cytoplasm based on microscopic images using blood smears. As an extension, Gelsema et al. performed image segmentation based on the principle of multiple grey level thresholding. Extracted features express geometry, optical density and texture properties. Theera-Umpon et al. used information of nucleus alone to classify white blood cells using the microscopic images of bone marrow smear. They analyzed a set of white-blood-cell-nucleus-based features using mathematical morphology. Tabrizi et al. extracted the color, morphological and textural features from the segmented nucleus and cytoplasm using blood smears for five-part WBC differential. These studies have shown the advantages of automated WBC identification using light microscopy compared to semi-automatic methods or manual investigation. Unfortunately, image quality can suffer from variations of illumination, uneven staining and color mixing, making these methods sensitive to error or variation. Several studies demonstrate the capability of cell identification using hyperspectral imaging, multispectral image or Raman spectroscopic imaging technologies which provide both spatial and spectral information. However, these studies also use samples of blood smear, which may change the actual cell morphology.

Conventional blood analysis is usually performed using bulky and expensive microscope or hematology analyzers. Recently, lens-free imaging technology has matured. Without using any optical lenses, the lens-free imaging techniques offer advantages in portability, scalability, and cost-effectiveness. An imaging flow cytometer can capture high content cell images and can provide much more information than just the single feature of a fluorescent label. Chen et al. extracted both optical and morphological features from the high-throughput quantitative images of cells in suspension. Dannhauser extracted 3D morphology features of mononuclear cells captured by a quantitative phase imaging holographic system, which consists of complicated microscopies. Lens-free imaging techniques bring new possibilities and challenges into blood flow cytometry. One of the recently developed lens free flow cytometers is based on digital holographic microscopy. Whereas the technique provides the appropriate hardware for imaging cells, an accurate and efficient cell identification technique still is required.

SUMMARY

It is an object of the present disclosure to provide efficient methods and systems for classifying cells.

In some embodiments, a cell classification system is provided allowing to classify cells in suspension, i.e. where the cells are not influenced by imaging them in a smear. Classification can be performed on images of cells that are less distorted than when these cells would be obtained in smears.

In some embodiments, an automated classification of cells is obtained, e.g. an automated high classification at least 3-part white blood cell classification based on lens-free holographic images. Such an automated classification can be based on a machine learning algorithm.

In some embodiments, the images used may be of fluorescent labeled samples, without biological purification of the samples being required.

In some embodiments, the most important features are used for cell recognition, resulting in a reduced computational cost for cell recognition, since accurate cell recognition can be performed without evaluating the full feature space.

The above objective is accomplished by a method and device according to the present disclosure.

The present disclosure relates to a cell differentiating system for differentiating cells, the system comprising an input means for receiving a reconstructed image of a cell based on a holographic image of the cell in suspension, and a cell recognition means for determining cell characterization features from the reconstructed image of the cell for characterization of the cell, wherein the cell recognition means is configured for determining, as cell recognition features, image moments, the image moments being defined as $$m_{ij} = \Sigma_{x,y}(f(x,y) \cdot x^i \cdot y^j) \text{ and}$$

$$\mu_{ij} = \Sigma_{x,y}(f(x,y) \cdot (x-\bar{x})^i \cdot (y-\bar{y})^j)$$

where $$\bar{x} = \frac{m_{10}}{m_{00}}, \bar{y} = \frac{m_{01}}{m_{00}}, \text{ and } \eta_{ij} = \frac{\mu_{ij}}{m_{00}^{(i+j)/2+1}}$$

wherein j and i are orders. $f(x, y)$ is pixel intensity located at $(x, y)$.

The system according to embodiments of the present disclosure is suitable for differentiating cells. In some embodiments, the system is suitable for differentiating white blood cells. In some embodiments. The system is suitable for differentiating white blood cells into T-lymphocytes, granulocytes, and monocytes. In some embodiments, the system is suitable for providing 3-part white blood cell (WBC) recognition based on reconstructions of images of WBC in suspension. In some embodiments, for WBC in suspension, accurate recognition can be obtained by using image moments.

In some embodiments, the image moments may be geometric moments.

In some embodiments, the cell recognition means may be configured for determining at least the following image moments as cell recognition features: $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$ and $\eta_{21}$. In some embodiments, for at least some datasets, accurate and fast cell recognition can be obtained by using the above identified image moments as cell recognition features. Thus, only a limited set of image moments need to be determined, while still getting accurate results for at least some datasets.

In some embodiments, the cell recognition means furthermore may be configured for determining the Zernike moment $Z_{20}$ as cell recognition feature:

$$Z_{n,m} = \frac{n+1}{\pi} \sum_x \sum_y f(x,y) V_{n,m}^*(\rho, \theta)$$

for $x^2+y^2 \leq 1$ and $$V_{n,m}(\rho,\theta) = R_{n,m} \exp(jm\theta)$$

n are non-negative integers representing order of the Zernike polynomials and m represents repetitions of Zernike polynomials which satisfy the constrain of $(n-|m|)$=even and $|m| \leq n$. $\theta$ is the azimuthal angle and $\rho$ is the radial distance $0 \leq \rho \leq 1 \cdot R_{n,m}$ are the radial polynomials $$R_{n,m} = \sum_{s=0}^{(n-|m|)/2} (-1)^s \frac{(n-s)!}{s!\left(\frac{n+|m|}{2}-s\right)! * \left(\frac{n-|m|}{2}-s\right)} \rho^{(n-2s)}.$$

In some embodiments, for at least some datasets the accuracy for cell recognition can be significantly improved by using one additional Zernike moment.

In some embodiments, the cell recognition means furthermore may be configured for also determining at least the following image moments as cell recognition features: $m_{30}$ and $\mu_{20}$. In some embodiments, for at least some datasets the accuracy for cell recognition can be significantly improved by use of additional image moments.

In some embodiments, the cell recognition means furthermore may be configured for also determining at least the following image moments as cell recognition features: $m_{02}$, $m_{10}$, $m_{20}$, $m_{21}$, $\eta_{02}$ and $\eta_{30}$. In some embodiments, the cell recognition technique results in a high accuracy for cell recognition in different datasets by using the identified image moments.

In some embodiments, the cell recognition means furthermore may be configured for determining the Zernike moments $Z_{20}$, $Z_{40}$, $Z_{60}$, and $Z_{80}$ as cell recognition features, with $$Z_{n,m} = \frac{n+1}{\pi} \sum_x \sum_y f(x,y) V_{n,m}^*(\rho, \theta)$$

for $x^2+y^2 \leq 1$ and $V_{n,m}(\rho,\theta) = R_{n,m} \exp(jm\theta)$ wherein n are non-negative integers representing order of the Zernike polynomials and m represents repetitions of Zernike polynomials which satisfy the constrain of $(n-|m|)$=even and $|m| \leq n$. $\theta$ is the azimuthal angle and $\rho$ is the radial distance $0 \leq \rho \leq 1$ and $R_{n,m}$ are the radial polynomials $$R_{n,m} = \sum_{s=0}^{(n-|m|)/2} (-1)^s \frac{(n-s)!}{s!\left(\frac{n+|m|}{2}-s\right)! * \left(\frac{n-|m|}{2}-s\right)} \rho^{(n-2s)}$$

as cell recognition feature.

The cell recognition means furthermore may be configured for determining the HU moments $hu_1$, $hu_5$ and $hu_7$ with $hu_1 = \eta_{20} + \eta_{02}$ $hu_5 = (\eta_{30} - 3\eta_{12})(\eta_{30}+\eta_{12})[(\eta_{30}+\eta_{12})^2 - 3(\eta_{21}+\eta_{03})^2] + (3\eta_{21}-\eta_{03})(\eta_{21}+\eta_{03})[3(\eta_{30}+\eta_{12})^2 - (\eta_{21}+\eta_{03})^2]$ $hu_7 = (3\eta_{21}-\eta_{03})(\eta_{21}+\eta_{03})[3(\eta_{30}+\eta_{12})^2 - (\eta_{21}+\eta_{03})^2] - (\eta_{30}-3\eta_{12})(\eta_{21}+\eta_{03})[3(\eta_{30}+\eta_{12})^2 - (\eta_{21}+\eta_{03})^2]$ as cell recognition feature.

In some embodiments, the cell recognition means furthermore may be configured for determining the cell diameter as cell recognition feature. In some embodiments, the cell recognition means furthermore may be configured for determining and the cell ridge as cell recognition feature.

In some embodiments, the system furthermore may comprise a cell classification means for classifying the cell as a white blood cell. In some embodiments, the cell classification means furthermore may be adapted for classifying the cell as a T-lymphocyte, a granulocyte or a monocyte based on the determined features of the cell determined using the cell recognition means.

In some embodiments, accurate classification of cells can be performed.

In some embodiments, the input means may comprise a hologram data acquisition system for acquiring hologram data of a cell in suspension.

In some embodiments, the input means may comprise a data preprocessing system configured for removing a background from the hologram data and/or for normalizing an illumination intensity of the hologram data.

In some embodiments, the input means may comprise an image reconstruction system.

In some embodiments, the cell recognition means may be configured for determining cell recognition features being exactly image moments $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$ and $\eta_{21}$ and Zernike moment $Z_{20}$.

In some embodiments, the cell recognition means may be configured for determining cell recognition features being exactly image moments $m_{00}$, $m_{01}$, $m_{11}$, $m_{12}$, $\mu_{03}$, $\mu_{12}$, and $\mu_{21}$, $\eta_{03}$, $\mu_{12}$, $\eta_{20}$, $\eta_{21}$, $m_{30}$ and $\mu_{20}$, Zernike moment $Z_{20}$ and the diameter.

In some embodiments, the cell recognition means may be configure for determining cell recognition features being exactly image moments $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$, $\eta_{21}$, $m_{30}$, $\mu_{20}$, $m_{02}$, $m_{10}$, $m_{20}$, $m_{21}$, $\eta_{02}$ and $\eta_{30}$, Zernike moments $Z_{20}$, $Z_{40}$, $Z_{60}$, $Z_{80}$, Hu moments $hu_1$, $hu_5$ and $hu_7$ and the diameter and ridge.

The present disclosure also relates to a diagnostic device comprising a system as described above for analyzing cells. The diagnostic device may be adapted for analyzing blood cells, such as for example white blood cells.

The present disclosure also relates to a method for differentiating cells, the method comprising receiving a reconstructed image of a cell based on a holographic image of the cell in suspension, and determining cell characterization features from the reconstructed image of the cell for characterization of the cell, wherein the cell recognition features comprise image moments, the image moments being defined as the spatial moments: $m_{ij} = \Sigma_{x,y}(f(x,y) \cdot x^i \cdot y^j)$,
and the central moments: $\mu_{ij} = \mu_{ij} = \Sigma_{x,y}(f(x,y) \cdot (x-\bar{x})^i \cdot (y-\bar{y})^j)$,
where $$\bar{x} = \frac{m_{10}}{m_{00}},$$
$$\bar{y} = \frac{m_{01}}{m_{00}},$$

and the normalized central moments:

$$\eta_{ij} = \frac{\mu_{ij}}{m_{00}^{(i+j)/2+1}}$$

wherein j and i are orders. f(x, y) is the pixel intensity located at (x, y).

In some embodiments, the cells may be white blood cells. In some embodiments, the method may be adapted for classifying white blood cells into T-lymphocytes, granulocytes and monocytes.

In some embodiments, the method furthermore may comprise, based on the determined cell recognition features, identifying whether a white blood cell is a T-lymphocyte, a granulocyte or a monocyte.

In some embodiments, the image moments may be geometric moments.

In some embodiments, determining cell characterization features from the reconstructed image of the cell may comprise determining at least the following image moments as cell recognition features:

$$Z_{n,m} = \frac{n+1}{\pi} \sum_x \sum_y f(x, y) V_{n,m}^*(\rho, \theta)$$

for $x^2 + y^2 \leq 1$ and $V_{n,m}(\rho, \theta) = R_{n,m} \exp(jm\theta)$ n are non-negative integers representing order of the Zernike polynomials and m represents repetitions of Zernike polynomials which satisfy the constrain of $(n-|m|)=$even and $|m| \leq n$. $\theta$ is the azimuthal angle and $\rho$ is the radial distance $0 \leq \rho \leq 1$. $R_{n,m}$ are the radial polynomials $$R_{n,m} = \sum_{s=0}^{(n-|m|)/2} (-1)^s \frac{(n-s)!}{s! \left(\frac{n+|m|}{2}-s\right)! * \left(\frac{n-|m|}{2}-s\right)!} \rho^{(n-2s)}.$$

In some embodiments, determining cell characterization features from the reconstructed image of the cell may comprise determining at least the following image moments as cell recognition features: $m_{30}$ and $\mu_{20}$.

In some embodiments, determining cell characterization features from the reconstructed image of the cell may comprise determining at least the following image moments as cell recognition features: $m_{02}$, $m_{10}$, $m_{20}$, $\eta_{02}$ and $\eta_{30}$.

In some embodiments, determining cell characterization features from the reconstructed image of die cell may comprise determining the Zernike moments $Z_{20}$, $Z_{40}$, $Z_{60}$ and $Z_{80}$ as cell recognition features, with $$Z_{n,m} = \frac{n+1}{\pi} \sum_x \sum_y f(x, y) V_{n,m}^*(\rho, \theta)$$

for $x^2 + y^2 \leq 1$ and $V_{n,m}(\rho, \theta) = R_{n,m} \exp(jm\theta)$ wherein n are non-negative integers representing order of the Zernike polynomials and m represents repetitions of Zernike polynomials which satisfy the constrain of $(n-|m|)=$even and $|m| \leq n$. $\theta$ is the azimuthal angle and $\rho$ is the radial distance $0 \leq \rho \leq 1$ and $R_{n,m}$ are the radial polynomials $$R_{n,m} = \sum_{s=0}^{(n-|m|)/2} (-1)^s \frac{(n-s)!}{s! \left(\frac{n+|m|}{2}-s\right)! * \left(\frac{n-|m|}{2}-s\right)!} \rho^{(n-2s)},$$

and determining the HU moments $hu_1$, $hu_5$ and $hu_7$ with $hu_1 = \eta_{20} + \eta_{02}$ $hu_5 = (\eta_{30} - 3\eta_{12})(\eta_{30} + \eta_{12})[(\eta_{30} + \eta_{12})^2 - 3(\eta_{21} + \eta_{03})^2] + (3\eta_{21} - \eta_{03})(\eta_{21} + \eta_{03})[3(\eta_{30} + \eta_{12})^2 - (\eta_{21} + \eta_{03})^2]$ $hu_7 = (3\eta_{21} - \eta_{03})(\eta_{21} + \eta_{03})[3(\eta_{30} + \eta_{12})^2 - (\eta_{21} + \eta_{03})^2] - (\eta_{30} - 3\eta_{12})(\eta_{21} + \eta_{03})[3(\eta_{30} + \eta_{12})^2 - (\eta_{21} + \eta_{03})^2],$
and determining the diameter and ridge as cell recognition features.

In some embodiments, the method may comprise classifying the cell as a white blood cell. In some embodiments, classifying may be classifying the cell as a T-lymphocyte, a granulocyte or a monocyte based on the determined features of the cell.

In some embodiments, receiving a reconstructed image of a cell may comprise acquiring hologram data of a cell in suspension.

In some embodiments, receiving a reconstructed image of a cell may comprise removing a background from the hologram data and/or normalizing an illumination intensity of the hologram data.

In some embodiments, receiving a reconstructed image of a cell may comprise reconstructing the image based on the hologram data, after removing the background and/or normalizing the illumination intensity.

Particular and preferred aspects of the disclosed systems and methods are set out in the accompanying independent and dependent claims. Features from the dependent claims may be combined with features of the independent claims and with features of other dependent claims as appropriate and not merely as explicitly set out in the claims.

For purposes of summarizing the disclosed systems and methods and the advantages achieved over the prior art, certain objects and advantages of the disclosed systems and methods have been described herein above. Of course, it is to be understood that not necessarily all such objects or advantages may be achieved in accordance with any particular embodiment of the disclosed systems and methods. Thus, for example, those skilled in the art will recognize that the disclosed systems and methods may be embodied or carried out in a manner that achieves or optimizes one advantage or group of advantages as taught herein without necessarily achieving other objects or advantages as may be taught or suggested herein.

The above and other aspects of the disclosed systems and methods will be apparent from and elucidated with reference to the embodiment(s) described hereinafter.

BRIEF DESCRIPTION OF THE DRAWINGS

The disclosed systems and methods will now be described further, by way of example, with reference to the accompanying drawings.

Figure 1:
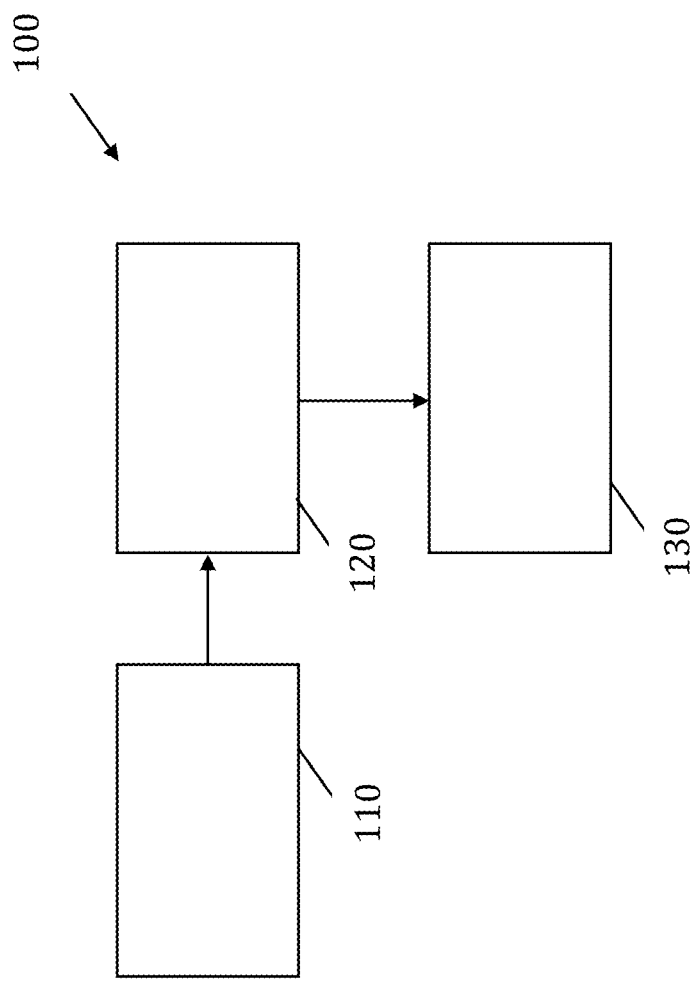
FIG. 1 illustrates a schematic overview of components of a cell differentiating system according to some embodiments of the present disclosure.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the disclosed systems and methods.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The disclosed systems and methods will be described with respect to particular embodiments and with reference to certain drawings but the disclosed systems and methods are not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present disclosure can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed systems and methods require more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

In a first aspect, the present disclosure relates to a cell differentiating system for differentiating cells. Whereas in the description of particular embodiments the system will be mainly described and illustrated with reference to a system for differentiating white blood cells and even more particularly for differentiating white blood cells into T-lymphocytes, granulocytes and monocytes, embodiments of the present disclosure are not limited thereto. More particularly, the system is suitable for characterization or differentiation of cells in flow in general. According to the present disclosure, the cell differentiating system comprises an input means for receiving a reconstructed image of a cell based on a holographic image of the cell in suspension. In some embodiments, the input means may be configured for receiving reconstructed images from an external source but may alternatively comprise an imaging means, such as for example a lens-free imaging flow cytometer, and an image reconstruction means for obtaining image reconstructions of the cell. In some embodiments, the input means may be adapted for receiving images from single cells, e.g. single cells in suspension. In some embodiments, the input means also may be adapted for receiving images from single cells in flow. In some embodiments, the cell thereby typically may be imaged using a spherical point radiation source, such as for example a spherical point source laser. In some embodiments, no segmentation of individual cells is required. Furthermore, in some embodiments, the cell differentiating system also comprises a cell recognition means for determining cell characterization features from the reconstructed image of the cell for characterization of the cell. In some embodiments, the cell recognition means is configured for determining, as cell recognition features, image moments for the reconstructed image. In some embodiments, these image moments may be geometric moments or a group of moments comprising such geometric moments. The image moments are defined as $m_{ij} = \Sigma_{x,y}(f(x,y) \cdot x^i \cdot y^j)$ and $\mu_{ij} = \Sigma_{x,y}(f(x,y) \cdot (x-\bar{x})^i \cdot (y-\bar{y})^j)$ where $$\bar{x} = \frac{m_{10}}{m_{00}}, y = \frac{m_{01}}{m_{00}}, \text{ and}$$

$$\eta_{i,j} = \frac{\mu_{i,j}}{m_{00}^{(i+j)/2+1}}$$

wherein j and i are orders and wherein f(x, y) is a digital image.

In some embodiments, the cell recognition means is adapted for determining at least the following image moments as cell recognition features: $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$ and $\eta_{21}$. Thus, in some embodiments, these moments may result in very efficient cell differentiation, e.g. if the features used are limited to these moments or to a group of features comprising these moments. In some embodiments also the Zernike moment $Z_{20}$ is added as cell recognition feature. Still other embodiments further include the image moments $m_{30}$ and $\mu_{20}$. In yet other embodiments, also the image moments $m_{02}$, $m_{10}$, $m_{20}$, $m_{21}$, $\eta_{02}$, $\eta_{30}$ are included. Still other embodiments include also the Zernike moments $Z_{20}$, $Z_{40}$, $Z_{60}$ and $Z_{80}$ as cell recognition features, the HU moments $hu_1$, $hu_5$, $hu_7$ and/or the diameter and/or ridge as cell recognition features. In some embodiments at least the following image moments were selected or exactly the following imaging moments were selected: $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$ and $\eta_{21}$ and $Z_{20}$. In other embodiments at least the following image moments were selected or exactly the following imaging moments were selected $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$ and $\eta_{21}$ and $Z_{20}$. In some embodiments, the cell recognition features are limited to those explicitly mentioned in the respective embodiments described above. It was surprisingly found that with the limited features indicated above for the different embodiments it was possible to obtain an accurate cell differentiation in a computational efficient way. Such features can be selected based on linear discriminant analysis. These models take into account the labeled information (cell classes) of the cell, resulting in highly relevant features for differentiating different cell types, such as for example the three subtypes of white blood cells. In some embodiments, the identification of the cell features may be based on a particular feature selection, as will be illustrated in a particular example described further below. Some of the selected features have some physical meaning. The moment $m_{00}$ is representative of the mass of the cell image, in the image being representative of the sum of the grey levels. The moment $m_{01}$ helps to describe the centroid of the image, i.e.

$$\bar{x} = \frac{m_{10}}{m_{00}}.$$

Alternatively for this moment or additionally also the moment $m_{10}$ can be used, also assisting in describing the centroid of the image, i.e.

$$y = \frac{m_{01}}{m_{00}}.$$

The moment $\mu_{03}$, $\mu_{12}$, $\mu_{21}$, and optionally $\mu_{30}$ and $\mu_{20}$ are invariant with respect to translations.

The moments $\eta_{03}$, $\eta_{12}$, $\eta_{20}$ and $\eta_{21}$ are invariant with respect to both translation and scale and the moment $Z_{20}$ is invariant with respect to rotation. According to some embodiments, the cell differentiating system also comprises a cell classification means for classifying the cells using the cell recognition features. By way of illustration, FIG. 1 shows a cell identification system 100 comprising an input means 110 for receiving a reconstructed image of a cell based on a holographic image of the cell in suspension, a cell recognition means 120 and a cell classification means 130. In some embodiments, the cell recognition means 120 and the cell classification means 130 may be combined. The cell differentiating system 100 may be implemented as software as well as hardware. Such a software may run on a processor. In some embodiments, the required amount of computing power for the processor can be limited since only a specific selection of recognition features are required as indicated above. As indicated above, in some embodiments, the system may be adapted for classifying cells for cells in suspension or flow. Thus, in some embodiments, holographic images can be used of cells in suspension or flow in contrast to cells in a smear, since classifying cells in a smear requires more processing of the blood sample and/or may result in a less accurate classification. In some embodiments, the input means thus may be adapted for receiving holographic images from or thus may comprise an imaging setup comprising a fluidic or microfluidic compartment, e.g. channel, that is adapted for receiving a suspension with the cells or a flow with the cells, as well as a holographic imaging means. The imaging means and the holographic image processing means and classifying system are combined in a single system, so as to allow for real-time imaging and classification. Further features and advantages of embodiments of the present disclosure will be illustrated with reference to a particular example described further below.

The present disclosure, in another aspect, also relates to a diagnostic device comprising a cell differentiating system for analyzing cells such as for example white blood cells. The cell differentiating system thereby is a cell differentiating system as described in the first aspect comprising the same features and advantages as embodiments described in the first aspect. Aside from the cell differentiating system—or where appropriate some components may be part of the cell differentiating system as well—in some embodiments, the diagnostic device may comprise a lens free imaging flow cytometer. In some embodiments, the flow cytometer may be compact. One example of a lens free imaging flow cytometer that may be used is based on a holographic set-up comprising a point source illumination source such as for example a waveguide a microfluidic chip and a high speed camera for imaging, such as for example a CMOS camera. In a particular example, immersion oil and a glass window are placed between the point source, the microfluidic chip and the camera, in order to create a complete refractive index-matched system. Radiation, e.g. laser light, is scattered by cells traveling through the main microfluidic channel. From the scattered and unscattered radiation an interference pattern or hologram is captured. Stroboscopic illumination is employed to avoid motion blur for the cells in flow in the system. In order to identify a cell, its hologram is numerically diffracted back to the channel plane and the resulting reconstruction is subsequently handled by the cell differentiating system. It will be clear that the particular flow cytometer described is only an example of a system that can be used in embodiments of the present disclosure for obtaining images of cells in flow, and therefore the present disclosure is not limited to this particular example. The diagnostic device has the advantage that it can be used as an inexpensive and portable cell analyzer, e.g. a haematology analyzer, that can be utilized at the point-of-care in emergency settings or in resource-limited settings.

In a third aspect the present disclosure relates to a method for differentiating cells. The method may for example be used for characterizing white blood cells, although embodiments are not limited thereto and can be applicable more general to cells in flow. The method comprises receiving a reconstructed image of a cell based on a holographic image of the cell in suspension, and determining cell characterization features from the reconstructed image of the cell for characterization of the cell. The cell recognition features comprise image moments being defined as the spatial moments:

$$m_{ij} = \Sigma_{x,y}(f(x,y) \cdot x^i \cdot y^j)$$

and the central moment:

$$\mu_{ij} = \Sigma_{x,y}(f(x,y) \cdot (x-\bar{x})^i \cdot (y-\bar{y})^j), \text{ where}$$

$$\bar{x} = \frac{m_{10}}{m_{00}}, \bar{y} = \frac{m_{01}}{m_{00}},$$

and the normalized central moments:

$$\eta_{i,j} = \frac{\mu_{ij}}{m_{00}^{(i+j)/2+1}}$$

wherein j and i are orders. f(x, y) is the pixel intensity of the digital image located at (x, y). In particular embodiments, at least the following image moments are selected as cell recognition features: $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$ and $\eta_{21}$.

In some embodiments at least the following image moments were selected or exactly the following imaging moments were selected: $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$ and $\eta_{21}$ and $Z_{20}$. In other embodiments at least the following image moments were selected or exactly the following imaging moments were selected: $m_{00}$, $m_{01}$, $m_{11}$, $m_{12}$, $m_{30}$, $\mu_{03}$, $\mu_{12}$, $\mu_{20}$, $\mu_{21}$, $\eta_{03}$, $\eta_{12}$, $\eta_{20}$ and $\eta_{21}$ and $Z_{20}$. In some embodiments, the cell recognition features are limited to those explicitly mentioned in the respective embodiments described above. It was surprisingly found that with the limited features indicated above for the different embodiments it was possible to obtain an accurate cell differentiation in a computational efficient way. Such features can be selected based on linear discriminant analysis. These models take into account the labeled information (cell classes) of the cell, resulting in highly relevant features for differentiating different cell types, such as for example the three subtypes of white blood cells.

The method, in some embodiments furthermore comprises the step of classifying the cell. In some embodiments, the method further may comprise method steps corresponding with the functionality of components of the system described in system embodiments of the first aspect of the present disclosure. In some embodiments, the method may be implemented as computer program product and may be stored on a processor. In some embodiments, the present disclosure thus also includes a computer program product which performs the method according to embodiments of the present disclosure when executed on a computing device. One configuration of a processor that can include such a computer program product may for example include at least one programmable computing component coupled to a memory subsystem that includes at least one form of memory, e.g., RAM, ROM, and so forth. It is to be noted that the computing component or computing components may be a general purpose, or a special purpose computing component. Thus, one or more aspects of the present disclosure can be implemented in digital electronic circuitry, or in computer hardware, firmware, software, or in combinations of them.

In another aspect, the present disclosure relates to a data carrier for carrying a computer program product for performing cell identification, e.g. using a system or device as described above. Such a data carrier may comprise a computer program product tangibly embodied thereon and may carry machine-readable code for execution by a programmable processor. The present disclosure thus relates to a carrier medium carrying a computer program product that, when executed on computing means, provides instructions for executing any of the functions as described for the devices and systems as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a memory chip or any other medium from which a computer can read. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fiber optics, including the wires that comprise a bus within a computer.

By way of illustration, embodiments of the present disclosure not being limited thereto, features and advantages of particular embodiments of the disclosure will be described with reference to test results illustrating recognizing and classifying three types of human white blood cells (WBCs) using lens-free holographic imaging in combination with a flow cytometer. These three types may be T-lymphocytes, granulocytes, and monocytes. A comprehensive image database for these three WBCs is thus established and is well balanced with respect to the fractional population sizes of the three types. The test results also illustrate how feature selection and classification algorithms can be obtained using machine learning techniques, whereby it is a stringent requirement for accuracy to have sufficient data. The obtained feature selection and classification algorithms illustrate the possibility for a fully automated, high-throughput blood analyzer such as compact flow cytometers as described in some embodiments of the present disclosure.

For a highly accurate cell recognition device based on a classification algorithm, the predictions with respect to a specific cell type made by such algorithm have to agree to a very high degree with a standard. In particular embodiments of the present disclosure such a standard may be represented by a reference measurement performed on the same blood sample and used to label the WBCs according to their subtype. In the present example, the labeling of WBCs in a reference measurement was achieved by fluorescent tagging. Fluorophores stain the three WBC types differently since they are attached to antibodies that bind selectively to specific subtypes out of all the possible WBCs. Typical antibodies for fluorescent labeling may be anti-CD3, anti-CD14, and anti-CD15. Under the influence of an external light source, the fluorophores are excited and re-emit at a different wavelength. Provided that there is little cross-contamination, the wavelength of light as emitted by a single cell or the re-emission event itself as a consequence of the target cell specific binding in a run is indicative of its type, hence fluorescent labeling leads to a standard of high quality.

In the present example, a cell preparation step was performed that enables the simultaneous recording of a fluorescent reference signal at the time the label-free imaging is performed on the cell passing across an imaging region of the flow cytometer. Blood donors were identified and blood was drawn from them under the consent of a supervising medical and ethical committee. The whole blood was divided into 2 mL aliquots which then were incubated with either the anti-CD3, anti-CD14, or anti-CD15 phycoerythrin-conjugated antibodies (BD Biosciences). Thus WBC subtype specific tagging by a fluorophore was obtained for lymphocytes, monocytes, and granulocytes, respectively. Phycoerythrin molecules were used for staining as those give rise to a very bright emission signal due to their high absorption coefficient and quantum efficiency. Moreover phycoerythrin emission spectra peak around 570 nm wavelengths to which CMOS imagers are very responsive. Thereafter the stained aliquots were washed to remove unwanted debris, plasma, platelets, and other undesired components present in human whole blood that may be sources of contamination during the reference measurements of investigated WBCs. Next, the washed samples were suspended in BD FACS Lyse solution in order to lyse the red blood cells still present in the aliquots. This was followed by another washing step which removes the lysed red blood cells and possible debris. Then the samples were suspended in a running buffer comprising PBS, 0.5% BSA, and 2 mM EDTA). In a last step, the cell concentration in each aliquot was adjusted to a same level of $3*10^6$ cells/mL so as to have a balanced number of WBC subtypes in each sample. This adjustment was achieved by counting WBCs with a Scepter cell counter (Merck Millipore). Adjusting the cell concentrations facilitated expediting the acquisition of a balanced image dataset of the three WBC types.

In the present example, the image acquisition of the prepared samples containing stained WBCs were performed by an imaging 532 nm laser beam focused above a transparent microfluidic flow channel through which the WBCs pass one at a time, thus illuminating the cells. Hydrodynamic focusing was used to align and load single WBCs into the focusing flow channel. The light of the illuminating laser that is transmitted, diffracted, or scattered by the fluidic channel and the cells was recorded by a CMOS imager, e.g. a CMOS camera or CMOS sensor, that may be positioned underneath the flow channel. In some embodiments, other optical elements may be placed between the flow channel and the CMOS imager, such as wavelength filters and thin dichroic mirrors that may improve signal quality in cases in which an additional fluorescent emission of light takes place which superposes the image forming light signal. In some embodiments of the present disclosure such additional fluorescent light will be absent because the WBCs are imaged and classified in a label-free manner. Nevertheless, for the sake of creating a reference, in the present example cross-referencing with fluorescent radiation was used. In the diagnostic system of the present example there was no lens, mirror or other bulky optical component required for holographic image formation on a compact CMOS sensor. This lens-free imaging has the advantage of reducing costs related to the design and fabrication of lenses or lens systems, reducing weight of the imaging flow cytometer, and removing aberrations imparted by lens elements that degrade image quality. In the present example the flow channel was a fully integrated microfluidic flow channel which further reduces size, cost, and weight of the imaging flow cytometer. This may make such a device scalable, cheaper and easy to transport.

In the present example the 532 nm imaging laser beam was focused by a 20× microscope objective. The same objective was used for focusing a 488 nm excitation laser beam onto the WBCs inside the transparent flow channel so as to trigger the emission of a fluorescent signal that identifies the WBC type. A separate, fast photodetector was used for this purpose such that a fluorescent emission event was quickly registered and the CMOS camera triggered so as to rapidly record holographic images of the WBC of interest before the WBC left the imaging area of the flow cytometer. This has the advantage that only WBCs of interest are imaged and those imagers stored on a hard drive for later image processing reducing drastically the storage requirements as compared to continuous recording of holographic images.

In the present example, the fluorescent signal was recorded as well and correlated to the holographic image record and serving as an additional feature for WBC recognition and classification. A field-programmable gate array (FPGA) was used and configured in such a way that it compared the measured, integrated fluorescent signal to a reference value set by the user above which it starts recording the measured value of the fluorescent signal, turns off the excitation laser beam, turns on the imaging laser beam, and triggers the capture of holographic images by the CMOS camera. The FPGA was used to control the exact timing of those event very rapidly by running a LabView program on it. Two consecutive holographic images were captured in such a configuration by setting a delay that allows for the imaged cell to leave the imaging area of the flow cytometer. This way of proceeding ensures that the two consecutive images captured could be used to perform background removal and hence, reduce image artifacts and enhance contrast during image reconstruction. This also alleviates the problem of changing illumination conditions due to laser misalignment, thermal variations of the laser focal point, multiple reflections, and stray light as they typically occur on timescales larger than the delay between the two consecutive holographic image captures; hence these effects may be accounted for by background subtraction.

Figure 2:
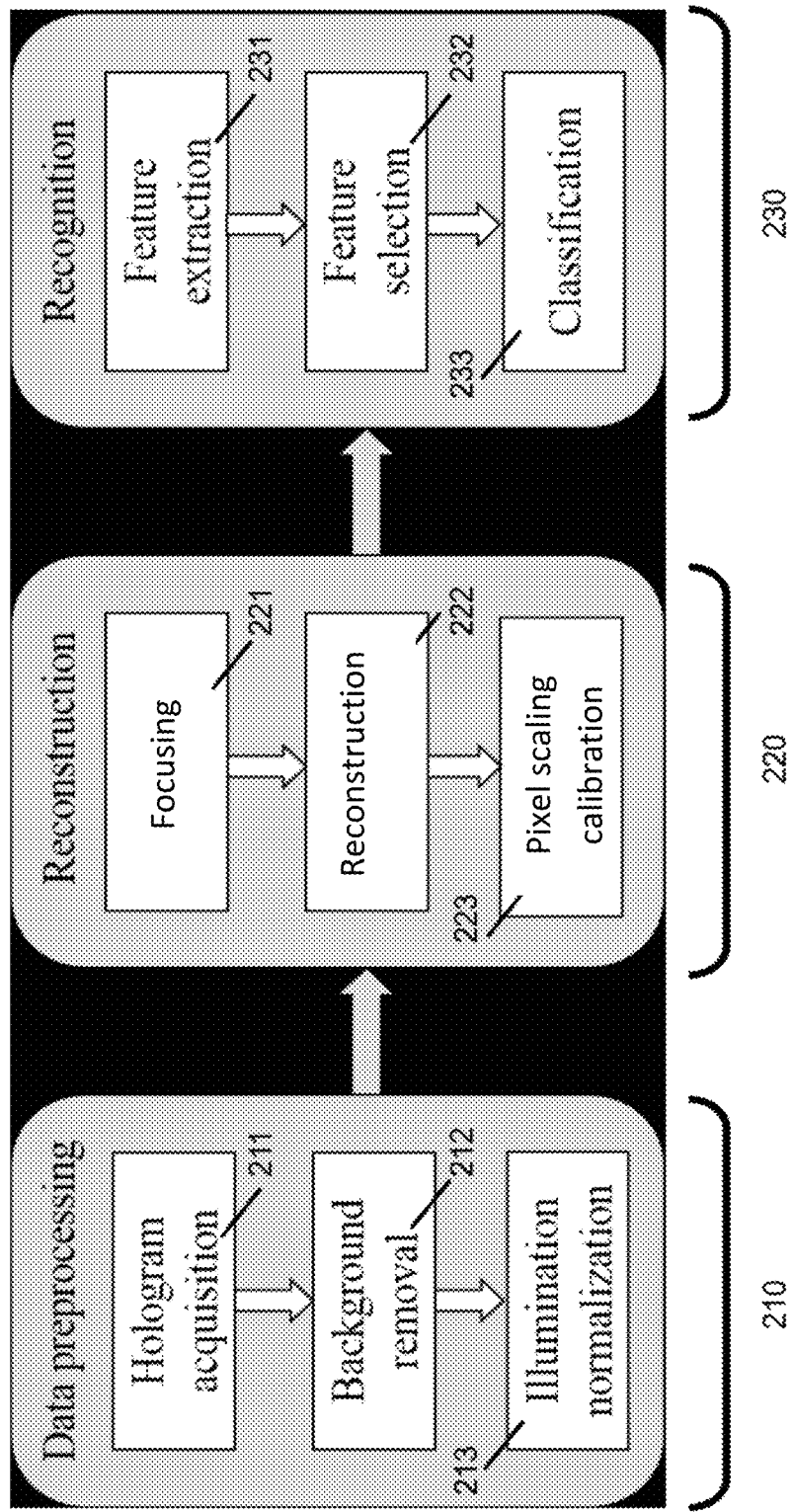
FIG. 2 shows a flow diagram of the WBC recognition pipeline, as can be used in some embodiments of the present disclosure.
Figure 3:
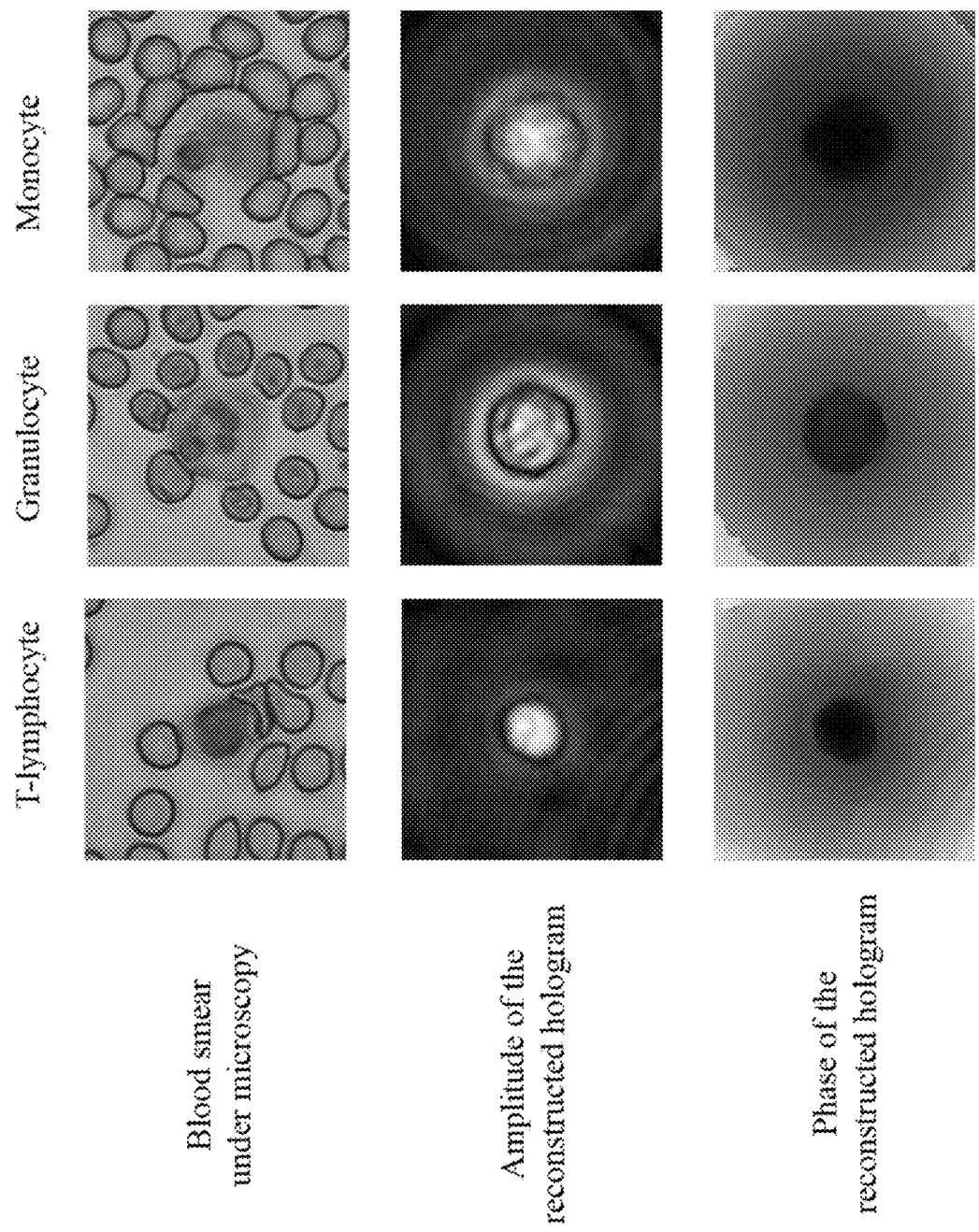
FIG. 3 shows conventional bright field microscope and lens-free, holographically reconstructed amplitude and phase images of three WBC types, the latter being used in some embodiments of the present disclosure.

Reference will now be made to FIGS. 2 and 3. In experiments, 5000 holographic, referenced images have been acquired 211 by applying the described cell preparation and image acquisition steps. Data preprocessing 210 was another step that was performed in preparing data as input for cell differentiating systems according to embodiments of the present disclosure. This typically precedes the reconstruction of microscopy images 220 from the underlying holographic images. Background removal 212 also was performed and was enabled by the two consecutively captured holographic images. It was used for significantly cancelling unwanted variations across the recorded images, e.g. by slowly changing illumination conditions. Another measure aiming at a reduction in variation across image data was the implementation of an intensity normalization step 213, i.e. all the holograms were normalized with respect to same illumination intensity profile.

The angular spectrum method, as the reconstruction method of choice, was used in the current example to propagate the holographic image back to the focal plane. By using digital holographic imaging techniques the focal plane may be easily shifted to an optimal plane at which the reconstruction is performed and results in the sharpest microscopic images of the cell. The focusing step 221 is shown in FIG. 2. However, a varying focal plane as a consequence of varying focal points of the illuminating laser beam or the axial displacement of the cells within the flow channel leads to a varying magnification factor for the reconstructed cell images. In the present example the resulting variations of pixel sizes were eliminated by rescaling to a uniform pixel size of typically 5 µm. This was achieved by calibrating the holographic imaging setup in such a way that the image magnification factor is known or may be inferred or interpolated by placing a characterized target of known dimensions at different planes, recording and reconstructing the holographic images, and comparing the apparent and actual size of the target at different axial positions. The reconstruction 222 followed by the pixel scaling calibration 223 is also shown in FIG. 2 Moreover, one may strive for even cleaner reconstructed microscopy images by removing the out-of-focus contribution of the twin image. The latter contribution may be estimated by inspection of the fringe pattern just outside the reconstructed cell. Digital holographic reconstruction methods have the additional advantage that the reconstructed image is complex and may be decomposed on an amplitude image as usually seen in bright field microscopy and a quantitive phase image similar to microscopy images seen in phase contrast microscopes. FIG. 3 shows exemplary bright field images of the three WBC types in a blood smear, their corresponding amplitude images as obtained through holographic reconstruction, as well as the phase images as obtained through holographic reconstruction.

In the present example numerous features 231 with regard to the morphological, biological, or optical aspects of the WBC were extracted during the recognition phase 230. Such features may be related to the geometry of the reconstructed WBC images, for instance by calculating geometric moments $m_{ij}$ of the reconstructed WBC amplitude image 32 having pixel intensities f(x, y) for a pixel located at the point (x, y) as indicated in Eq. 1a. Since these moments lack desirable invariance properties that exploit symmetries in the image and have the advantage of reducing effectively image dimensions and speeding up image processing notwithstanding the fact that they encode the most relevant information of the image in condensed form, also centered moment $\mu_{ij}$, Eq. 1b, and scale invariant moments $\eta_{ij}$, Eq. 1c, were introduced. There is a total of 24 such moment coefficients that are independent and include moments up to the third degree.

$$m_{ij} = \Sigma_{x,y}(f(x,y) \cdot x^i \cdot y^j) \quad \text{(Eq. 1a)}$$

$$\mu_{ij} = \Sigma_{x,y}(f(x,y) \cdot (x - m_{10}/m_{00})^i \cdot (y - \overline{m_{01}/m_{00}})^j) \quad \text{(Eq. 1b)}$$

$$\eta_{ij} = \mu_{ij}/\mu_{00}^{1+0.5(i+j)}, i+j \geq 2 \quad \text{(Eq. 1c)}$$

Figure 4:
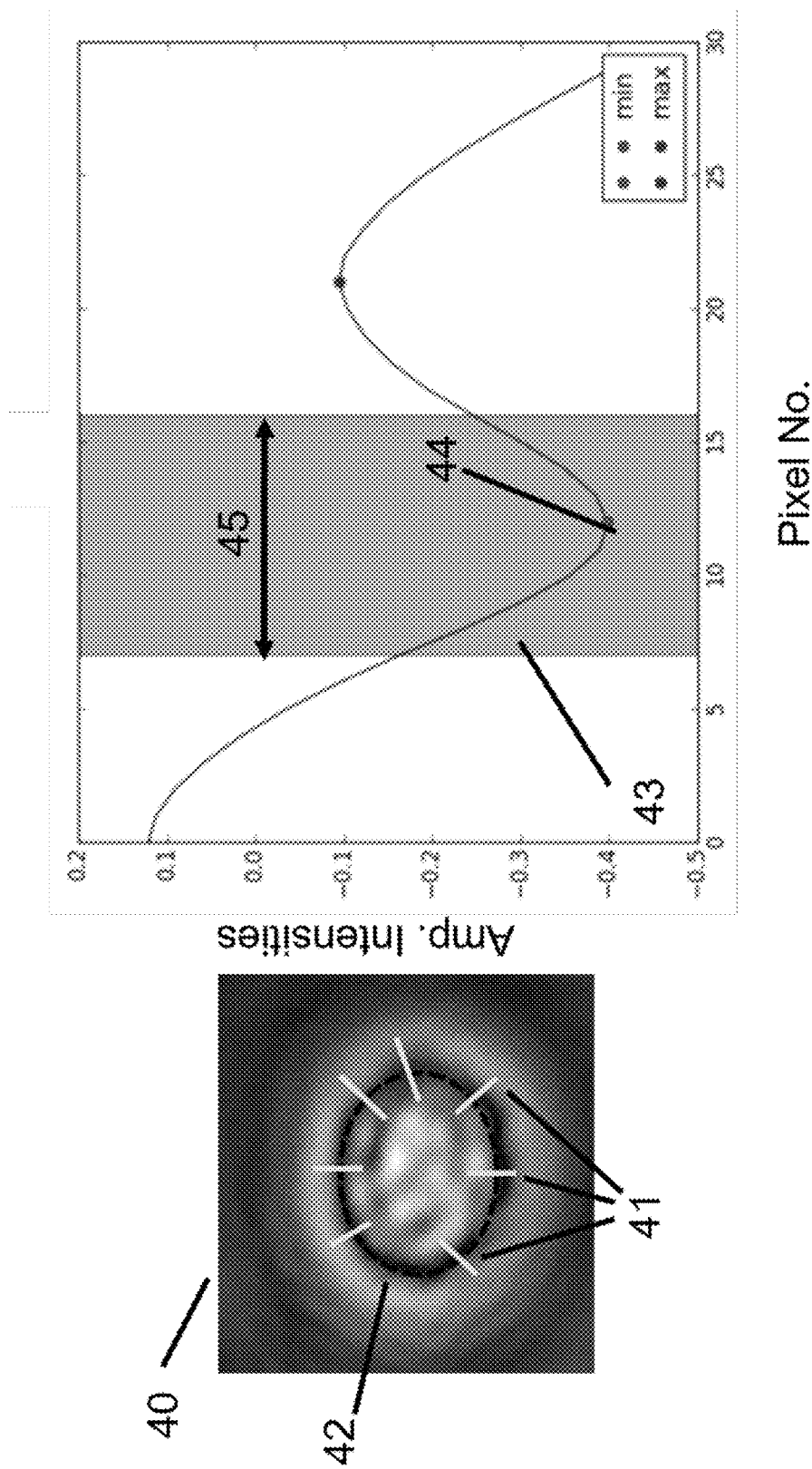
FIG. 4 shows a measurement of a WBC edge and extracted edge features, as can be used in embodiments of the present disclosure.

Furthermore, rotationally invariant Hu moments were also determined which may be another set of geometric extracted features 231. There are seven such Hu moments that derive from the degree three moments. A further set of geometric moments establishing extracted features 231 of the reconstructed WBC images are the set of fixed order Zernike polynomials. Zernike polynomials have the advantage that they form an orthogonal, rotation invariant basis and therefore are less redundant than the corresponding geometric moments of corresponding degree. In the present example 24 such Zernike polynomials were used as extracted features 231 relating to the cell's morphology. Other morphological features 231 were extracted such as the reconstructed cell diameter or the cell ridge along its edge as a measure of the WBC size and linear internal patterns. Cell edges were detected by the zero-crossing of second order directional derivatives operating on the reconstructed WBC phase image. A circle was fitted to the detected edge points so as to derive a cell diameter. Two other features 231 were extracted based on the edge characteristics proper to the reconstructed cell. This is shown in FIG. 4. Drawing normal lines 41 across the cell edges 42 of a reconstructed amplitude image 40 of the WBC, one detects a sudden drop in intensities 43 as one progresses outwards along such a normal. This is because edges typically appear dark in reconstructed holographic amplitude images 32. Averaging the minimum intensities 44 occurring in the drop region 43 over the number of normal drawn around the cell circumferential edge 42 and ignoring possible outliers, e.g. due to the presence of granules close to the cell edge 42, allowed extraction of an edge intensity feature 231. Moreover, an edge width feature 231 was extracted by measuring the average full width half minimum 45 around the cell's circumferential edge 42. Therefore, a total of 60 extracted features 231 were obtained in the present example.

In the present example, a feature selection stage 232 followed the feature extraction stage 231 during the WBC recognition phase 230. Feature selection 232 aims at reducing the number of characterizing features that are necessary for a successful classification 233 of the WBCs. Feature selection 232 is useful in high-throughput flow cytometry applications, in which the number of holographic images that need to be reconstructed per second is already a computationally intensive operation; every extra feature extraction 231 with only little impact on the classification result 233 leads to computational overhead that is avoided if those features 231 were not extracted. The feature selection illustrates how embodiments of the present disclosure can be so beneficial with respect to accuracy and selectiveness. Another beneficial factor of feature selection 232 may be a faster classification 233 of WBCs. This may be of importance in cell sorting applications in integrated flow cytometry devices with limited latency between the imaging trigger event and the sorting or separating event during which the cell is deviated from its original path according to its type. At high flow speeds and short, compact distances a decision has to be taken within this short latency period; the decision may involve the image reconstructing 221, feature extraction 231, feature selection 232, and classification 233 stages for instance. Feature selection 232 may also enable weighting extracted features 231 according to their importance in discriminating between WBC types. In general it may prove useful to center and normalize all the extracted features 231 before starting the selection stage 232 or classification stage 233.

In experiments on WBC recognition 230 the total amount of reconstructed images 221 and the extracted features thereof 231 is randomly split into a training and a testing set. In some embodiments, 75% of the available data is used for training and 25% for testing the trained feature selection 232 and classification 233 algorithm. The statistical effect of sampling from a limited dataset may be mitigated by the use of shuffle-split validation which resamples and splits 10 times the total available data into a test and a validation subset. The accuracy achieved by the classification method 233 may be averaged accordingly over the ten folds, whereby classification accuracy is defined as the percentage of the ratio of correctly classified WBC types and the total amount of WBC samples in the test fold.

Figure 5:
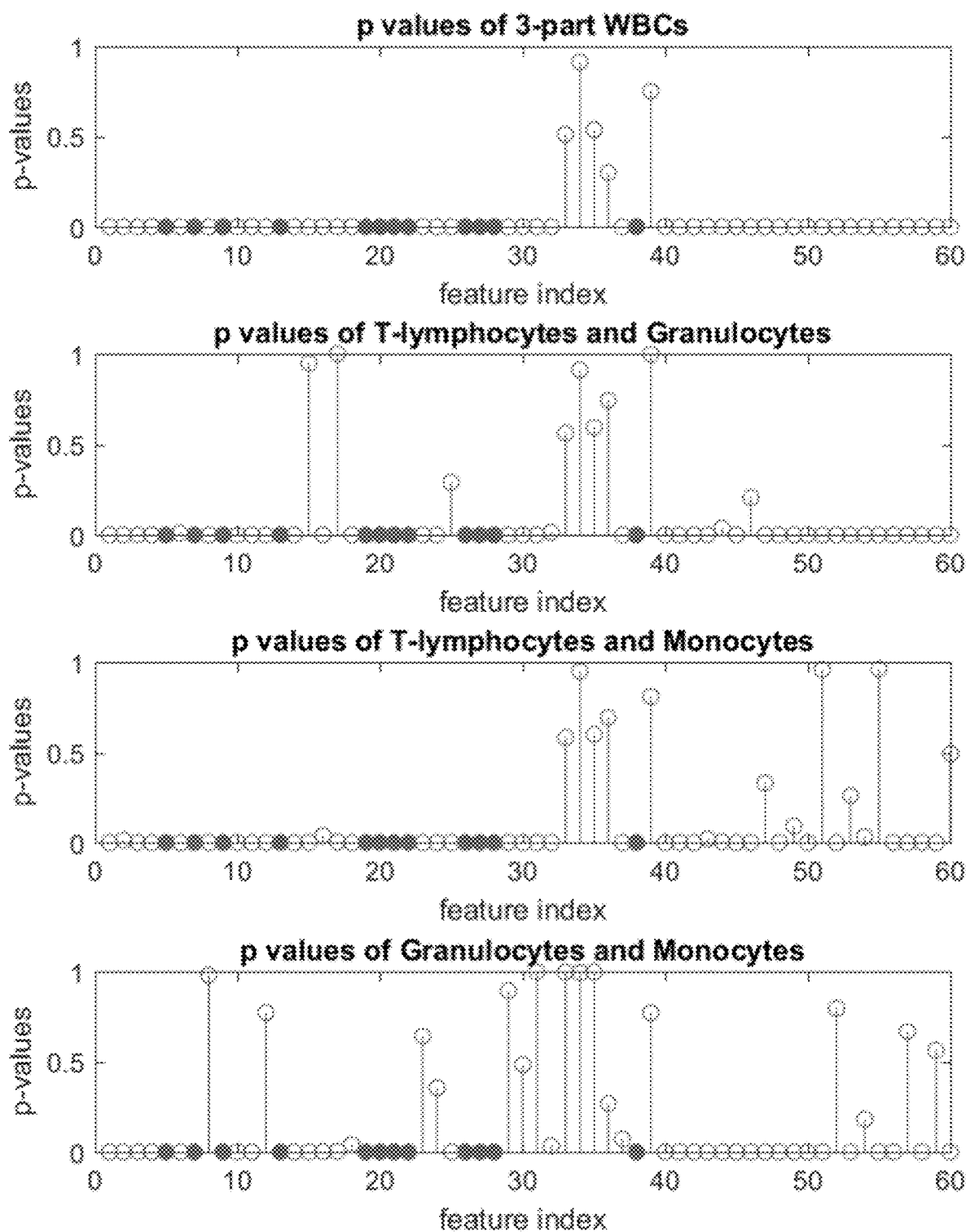
FIG. 5 shows the resulting p-values of one-way ANOVA for each feature extracted and differentiated for possible pairs of white blood cells, according to some embodiments of the present disclosure.

In the present example, analysis of variance, ANOVA, was used to assess the importance of extracted features 231. This was achieved by performing a series of statistical t-tests and affirm or reject the null hypothesis of equal group means for a particular feature variable. More specifically the null hypothesis was rejected for the statistical p-value being smaller than a fixed level of significance, e.g. $p<0.05$. Useful features 231 were thus selected if the corresponding p-value was small as they introduce differences in the group means that are significant. Likewise, extracted features 231 with large p-values under ANOVA testing tend to affirm the null hypothesis and were interpreted as having little impact on discriminating between WBC groups. The top graph of FIG. 5 lists the p-values that was derived from 60 extracted features 231 by performing ANOVA as the selection rule 232. Furthermore, ANOVA for feature selection 232 was performed using different pairing of WBC types. This is illustrated in FIG. 5 in the last three graphs for all possible pairings of WBC groups, viz. T-cells and granulocytes, T-cells and monocytes, and granulocytes and monocytes. Filled circles in FIG. 5 correspond to extracted features that perform well under linear discriminant analysis, LDA, as selection criterion 232 too.

Figure 6:
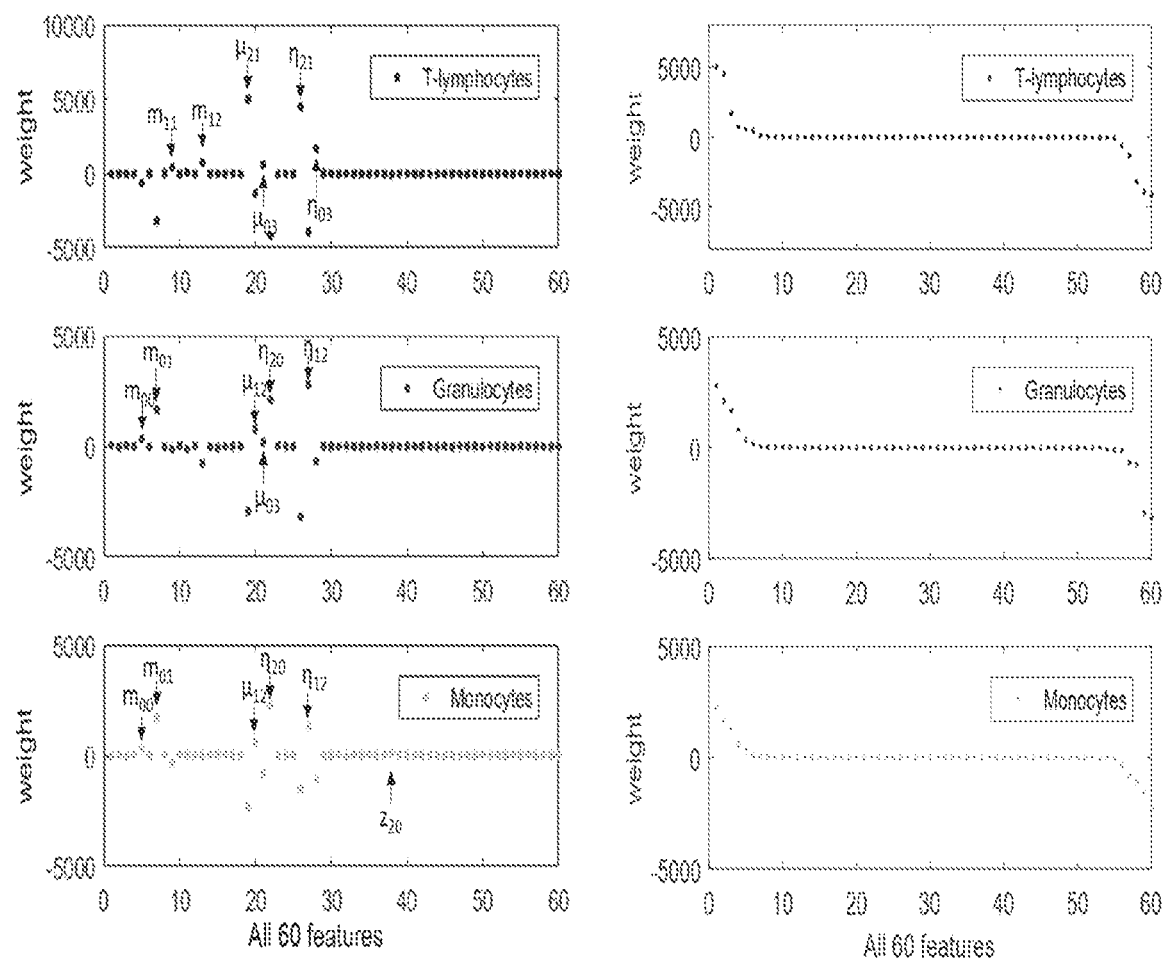
FIG. 6 shows the strength of standardized coefficients obtained by linear discriminant analysis for all three white blood cells, according to some embodiments of the present disclosure.

In the example LDA was also used as selection rule 232. LDA is a widely used machine learning algorithm that is used for dimensionality reduction. It projects high dimensional data onto lower dimensional spaces in which the data is visualized or classified more easily. LDA was used as projection and feature dimension limiting algorithm 232 and as classification algorithm 233 at the same time. This has the advantage of limiting the complexity of the computer code that runs the instruction for cell recognition 230 on a data processing device, e.g. an application-specific integrated circuit (ASIC) or computer. LDA makes the assumption of homoscedastic, normally distributed classes and fits separating hyperplanes between the projected clusters of WBC types. The linearity of the separating hyperplanes is an attractive feature for implementing LDA as a selection rule 232 and classification method 233, as the decision hyperplanes are easily implemented as dot products of vectors, a weight vector characterizing the position and orientation of the separating hyperplane and the feature vector 231 which combines all the extracted features. Importance of features was measured by introducing standardized coefficients of the discriminating functions. A strongly positive standardized coefficient favored the variance between WBC groups and the associated feature may be selected for classification. FIG. 6 illustrates the coefficient weights as obtained by using LDA on 60 extracted features 231. Some coefficients associated to specific features were beyond unity indicating correlations among features in this particular case. In the present example the three features associated to the three strongest coefficients in each WBC group were selected for classification, in another embodiment the six strongest features in each group were selected for classification. For the latter case experiments have shown overlapping features among the three WBC groups reducing their effective number to twelve. It is therefore an advantage of LDA as selection rule 232 therefore significantly reduces the number of relevant extracted features 231, e.g. from 60 to twelve.

In the present example, the classification algorithm 233 for WBC recognition 230 based on the set of selected features 232 could be selected from LDA, quadratic discriminant analysis (QDA), support vector machines (SVMs), nearest neighbor algorithms, random forests, decision trees, naïve Bayes, AdaBoost, or any other suitable classification algorithm as is appreciated by a person skilled in this field. The overall best performing algorithm in this particular experiment was SVM-linear, a linear kernel SVM. Support vector machines, as LDA, may be advantageous in some cases where linear separating planes are easily implemented and rapidly executed. Moreover, use of SVM or LDA may require only a small set of model parameters to be stored, e.g. the support vectors or the class centroids or discriminating function coefficients, respectively. The parameter look up and retrieval is thus fast in such examples leading to short latency periods. SVM has the advantage of implementing the kernel trick which implies that it may achieve classification 233 and good separability in high-dimensional nonlinear embedding spaces for which the explicit embedding functions do not have to be carried out.

Figure 7:
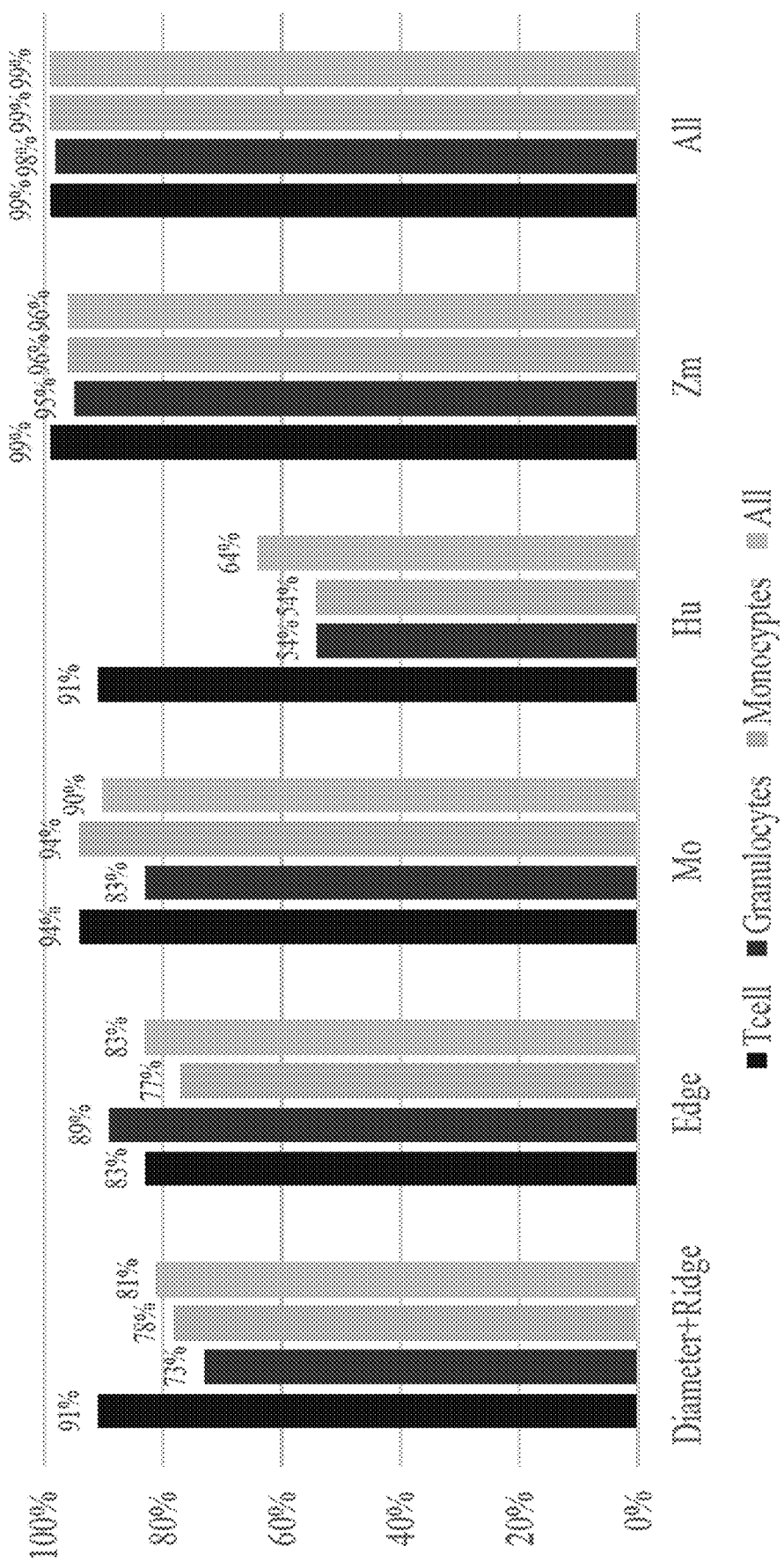
FIG. 7 compares classification accuracies for linear SVM for grouped features, according to some embodiments of the present disclosure.

FIG. 7 shows the classification accuracies of SVM-linear for the present example for the case of grouped extracted features 232, e.g. cell diameter and ridge, edge features (intensity and width) only, geometric moments, Hu moments, and Zernike moments.

Figure 8:
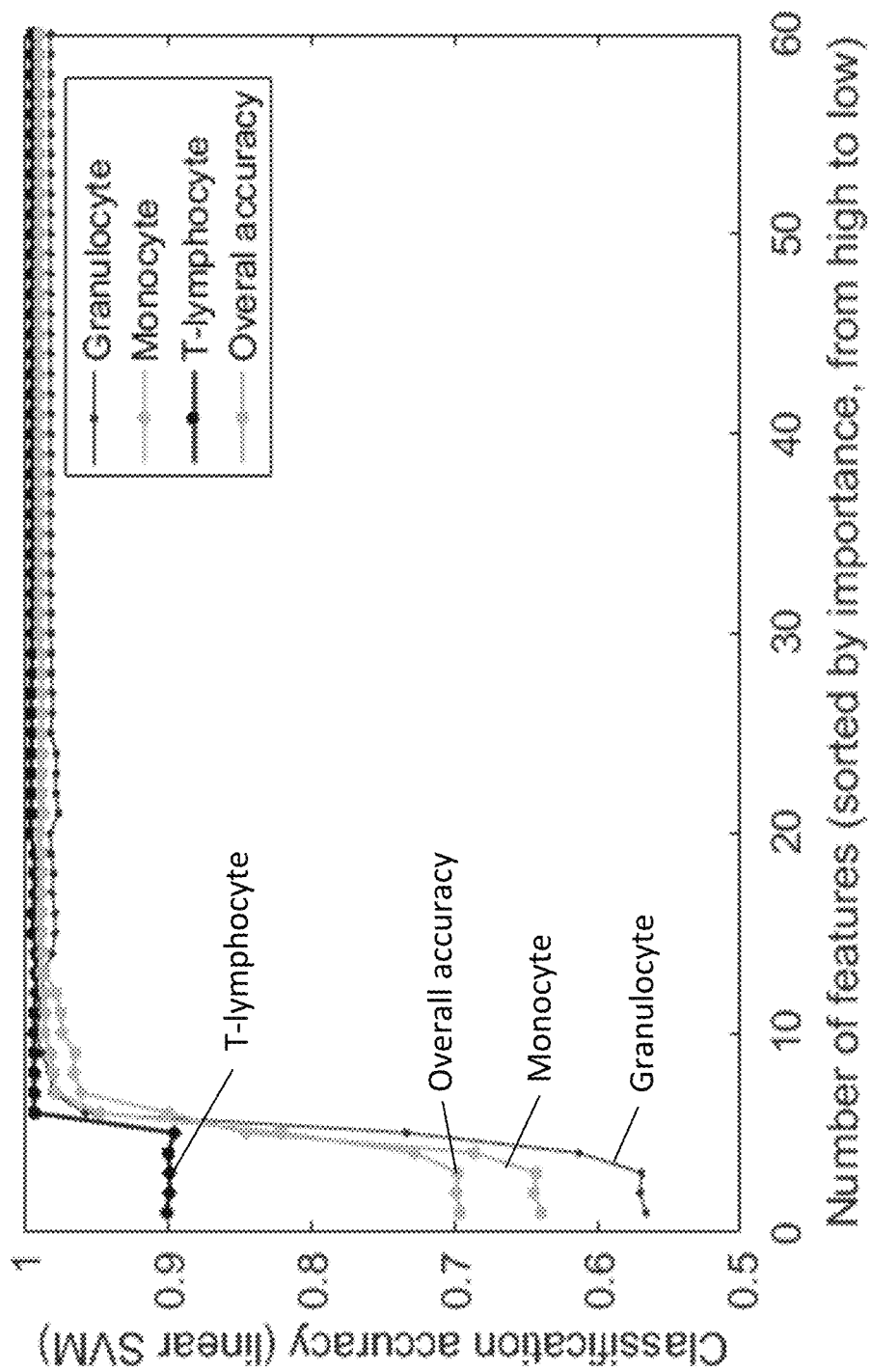
FIG. 8 illustrates the marginal increase in classification accuracy of linear SVM as the number of selected features is increased, according to some embodiments of the present disclosure.

FIG. 8 shows another feature selection strategy 232 which focuses on the experimental increase in classification accuracy of SVM-linear as more and more features 231 are included into the set of selected features. The features 231 to be included are ranked according to their LDA standardized coefficients in descending order as described before. Features of WBC groups may overlap. In this particular experiment the first six dominant features of each WBC group lead to almost optimal classification scores; the curves saturate quickly to a plateau value and the marginal gain in accuracy when adding more insignificant features is very small.

In this example, three-part WBC differential is achieved by lens-free and label-free holographic imaging of cells suspended in a flow. Accuracies of 99% were obtained in experiments in which fluorescent labeling was used to establish a reference line. Fast and fully automated cell recognition and high throughput may be achieved by quick holographic image reconstruction combined with the described advantages of feature reduction and properly designed classification algorithms.

The invention claimed is:

1. A cell differentiation system for differentiating cells, the system comprising:
   (a) an input means for receiving a reconstructed image of a cell based on a holographic image of the cell in suspension; and
   (b) a cell recognition means for determining cell characterization features from the reconstructed image of the cell for characterization of the cell;
wherein the cell recognition means is configured for determining, as cell recognition features, image moments, the image moments being defined as:

$$m_{ij} = \Sigma_{x,y}(f(x,y) \cdot x^i \cdot y^j),$$

$$\mu_{ij} = \Sigma_{x,y}(f(x,y) \cdot (x-\bar{x})^i \cdot (y-\bar{y})^j), \text{ where}$$

$$\bar{x} = \frac{m_{10}}{m_{00}}, \bar{y} = \frac{m_{01}}{m_{00}}, \text{ and}$$

$$\eta_{ij} = \frac{\mu_{ij}}{m_{00}^{(i+j)/2+1}}$$

wherein j and i are orders and
wherein f(x, y) is the pixel intensity of the digital image located at (x, y).

2. The system according to claim 1, wherein the cell recognition means is configured for determining at least the following image moments as cell recognition features: $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$ and $\eta_{21}$.

3. The system according to claim 2, wherein the cell recognition means is further configured for determining the Zernike moment $Z_{20}$ as cell recognition feature, with the Zernike moments of an image are defined as:

$$Z_{n,m} = \frac{n+1}{\pi} \sum_x \sum_y f(x,y) V_{n,m}^*(\rho, \theta)$$

for $x^2+y^2 \leq 1$ and $$V_{n,m}(\rho,\theta) = R_{n,m} \exp(jm\theta),$$

wherein
n are non-negative integers representing order of the Zernike polynomials,
m represents repetitions of Zernike polynomials which satisfy the constraints of (n−|m|)=even and |m|≤n,
θ is the azimuthal angle,
ρ is the radial distance 0≤ρ≤1, and
$R_{n,m}$ are the radial polynomials $$R_{n,m} = \sum_{s=0}^{(n-|m|)/2} (-1)^s \frac{(n-s)!}{s!\left(\frac{n+|m|}{2}-s\right)! * \left(\frac{n-|m|}{2}-s\right)!} \rho^{(n-2s)}.$$

4. The system according to claim 2, wherein the cell recognition means is further configured for also determining at least the diameter as cell recognition feature.

5. The system according to claim 2, wherein the cell recognition means is further configured for also determining at least the following image moments as cell recognition features: $m_{30}$ and $\mu_{20}$.

6. The system according to claim 2, wherein the cell recognition means is further configured for determining the Zernike moments $Z_{20}$, $Z_{40}$, $Z_{60}$ and $Z_{80}$ as cell recognition features, with $$Z_{n,m} = \frac{n+1}{\pi} \sum_x \sum_y f(x,y) V_{n,m}^*(\rho, \theta)$$

for $x^2+y^2 \leq 1$ and $V_{n,m}(\rho,\theta) = R_{n,m} \exp(jm\theta)$
wherein
n are non-negative integers representing order of the Zernike polynomials,
m represents repetitions of Zernike polynomials which satisfy the constraints of (n−|m|)=even and |m|≤n,
θ is the azimuthal angle,
ρ is the radial distance 0≤ρ≤1, and
$R_{n,m}$ are the radial polynomials $$R_{n,m} = \sum_{s=0}^{(n-|m|)/2} (-1)^s \frac{(n-s)!}{s!\left(\frac{n+|m|}{2}-s\right)! * \left(\frac{n-|m|}{2}-s\right)!} \rho^{(n-2s)}.$$

7. The system according to claim 2, wherein the cell recognition means is further configured for also determining at least the following image moments as cell recognition features: $m_{02}$, $m_{10}$, $m_{20}$, $m_{21}$, $\eta_{02}$ and $\eta_{30}$.

8. The system according to claim 2, wherein the cell recognition means is further configured for determining the HU moments $hu_1$, $hu_5$, and $hu_7$, wherein $$hu_1 = \eta_{20} + \eta_{02},$$

$$hu_5 = (\eta_{30} - 3\eta_{12})(\eta_{30} + \eta_{12})[(\eta_{30} + \eta_{12})^2 - 3(\eta_{21} + \eta_{03})^2] + (3\eta_{21} - \eta_{03})(\eta_{21} + \eta_{03})[3(\eta_{30} + \eta_{12})^2 - (\eta_{21} + \eta_{03})^2],$$

$$hu_7 = (3\eta_{21} - \eta_{03})(\eta_{21} + \eta_{03})[3(\eta_{30} + \eta_{12})^2 - (\eta_{21} + \eta_{03})^2] - (\eta_{30} - 3\eta_{12})(\eta_{21} + \eta_{03})[3(\eta_{30} + \eta_{12})^2 - (\eta_{21} + \eta_{03})^2],$$
and ridge as cell recognition features.

9. The system according to claim 1, wherein the system further comprises a cell classification means for classifying the white blood cell as a T-lymphocyte, a granulocyte, or a monocyte based on the determined features of the white blood cell determined using the cell recognition means.

10. The system according to claim 1, wherein the input means comprises a hologram data acquisition system for acquiring hologram data of a white blood cell in suspension.

11. The system according to claim 1, wherein the input means comprises a data preprocessing system configured for removing a background from the hologram data and/or for normalizing an illumination intensity of the hologram data.

12. The system according to claim 1, wherein the input means comprises an image reconstruction system.

13. The system according to claim 1, the system being adapted for differentiating white blood cells into T-lymphocytes, granulocytes, and monocytes.

14. A diagnostic device comprising the system according to claim 1, for analyzing cells.

15. A method for differentiating cells, the method comprising:
(a) receiving a reconstructed image of a cell based on a holographic image of the cell in suspension; and
(b) determining cell characterization features from the reconstructed image of the cell for characterization of the cell;
wherein the cell recognition features comprise image moments, the image moments being defined as:
the spatial moments: $m_{ij}=\Sigma_{x,y}(f(x,y) \cdot x^i \cdot y^j)$ the spatial moments:
and the central moment $\mu_{ij}=\Sigma_{x,y}(f(x,y) \cdot (x-\overline{x})^i \cdot (y-\overline{y})^j)$, where $$\overline{x} = \frac{m_{10}}{m_{00}}, \overline{y} = \frac{m_{01}}{m_{00}};$$

and the normalized central moments:

$$\eta_{ij} = \frac{\mu_{ij}}{m_{00}^{(i+j)/2+1}};$$

wherein j and i are orders, and
wherein f(x, y) is the pixel intensity of the digital image located at (x, y).

16. The method according to claim 15, wherein determining cell characterization features comprises determining the following image moments as cell recognition features: $m_{00}$, $m_{01}$, $m_{11}$, $m_{12}$, $\mu_{03}$, $\mu_{12}$, and $\mu_{21}$, $\eta_{03}$, $\eta_{12}$, $\eta_{20}$ and $\eta_{21}$ and $Z_{20}$,
wherein the Zernike moments of an image are defined as:

$$Z_{n,m} = \frac{n+1}{\pi} \sum_x \sum_y f(x,y) V^*_{n,m}(\rho, \theta)$$

for $x^2+y^2 \leq 1$ and
$V_{n,m}(\rho,\theta)=R_{n,m} \exp(jm\theta)$
wherein:
n are non-negative integers representing order of the Zernike polynomials,
m represents repetitions of Zernike polynomials which satisfy the constraints of (n−|m|)=even and |m|≤n;
θ is the azimuthal angle;
ρ is the radial distance 0≤ρ≤1; and
$R_{n,m}$ are the radial polynomials $$R_{n,m} = \sum_{s=0}^{(n-|m|)/2} (-1)^s \frac{(n-s)!}{s! \left(\frac{n+|m|}{2}-s\right)! * \left(\frac{n-|m|}{2}-s\right)!} \rho^{(n-2s)}.$$

17. The method according to claim 16, wherein determining cell characterization features further comprises determining the image moments $m_{30}$, $\mu_{20}$, and the cell diameter.

18. The method according to claim 15, wherein the method further comprises, based on the determined cell recognition features, identifying whether a cell is a white blood cell.

19. The method according to claim 15, wherein the method further comprises, based on the determined cell recognition features, identifying whether a white blood cell is a T-lymphocyte, a granulocyte, or a monocyte.

* * * * *